Oct. 18, 1955  P. SISKIND  2,721,298
MOTOR CONTROL APPARATUS
Filed Sept. 25, 1951
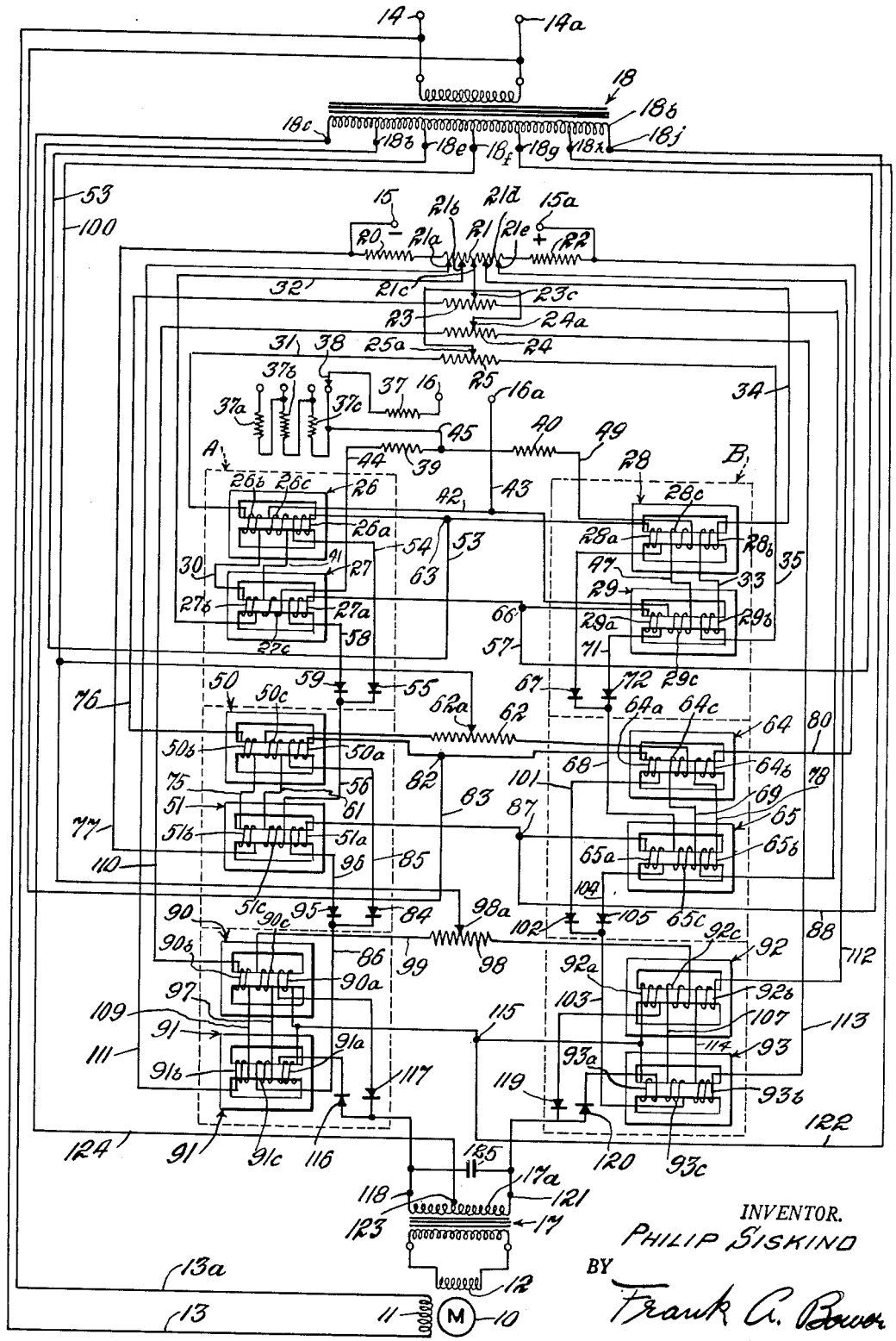
INVENTOR.
PHILIP SISKIND
BY
Frank A. Bower
ATTORNEY United States Patent Office 2,721,298
Patented Oct. 18, 1955

2,721,298

MOTOR CONTROL APPARATUS

Philip Siskind, New York, N. Y., assignor to Ward Leonard Electric Company, a corporation of New York Application September 25, 1951, Serial No. 248,259

2 Claims. (Cl. 318—207)

This invention relates to motor control apparatus and is directed particularly to the control of the direction of rotation and the speed of rotation of a two phase low inertia fractional horse-power motor.

The main object of the invention is to provide control apparatus that controls the rotation of speed of a two phase motor driven from a single phase alternating current source. Another object of the invention is to provide a control apparatus that creates a leading and a lagging voltage to control the motor. Another object of the invention is to control a two phase motor driven from a single phase alternating current source by a small direct voltage. Another object of the invention is to provide a balance control circuit that is unbalanced to operate a motor. Other objects and advantages will be understood from the following description taken in connection with the accompanying drawing.

In the embodiment shown in the drawing the motor 10 is a two phase motor with two windings 11 and 12. The voltage applied to the winding 11 is a fixed voltage and is directly connected by the wires 13 and 13a to the input terminals 14 and 14a. A variable voltage is applied to the winding 12 and controls the speed and direction of rotation of the motor. The variable voltage applied to the winding 12 either leads the fixed voltage applied to the winding 11 by ninety degrees and causes the motor 10 to rotate in one direction or lags the fixed voltage applied to the winding 11 by ninety degrees and rotates the motor 10 in the other direction. The magnitude and phase of the variable voltage applied to the winding 12 is determined by the control apparatus connected between the winding 12 and the input terminals 14 and 14a.

This control apparatus comprises amplification channels A and B, the bias circuit connected to the terminals 15, 15a and the control circuit connected to terminals 16 and 16a. The channels A and B are identical and are balanced to have under non-rotating conditions equal outputs. The outputs of the channels are connected in opposition by the output transformer 17 so that the currents impressed by the channels on the primary winding 17a are in opposition and 180° out of phase with respect to one and other.

The operation of the channels A and B is controlled by a direct control voltage applied across the terminals 16 and 16a. When the terminal 16a is positive with respect to terminal 16 the output of channel A increases and that of channel B decreases. Channel A will impress a larger current on primary winding 17a than channel B and control the direction of rotation of the motor 10. As the magnitude of the control voltage is increased and terminal 16a is made more positive, the output current of channel A becomes larger and channel B smaller.

When terminal 16 is positive with respect to terminal 16a, channel B will have the larger output current and will control the rotation of the motor 10 and turn it in the opposite direction. The phase of the voltage applied to winding 12 is caused to lag the phase of the voltage applied across winding 11. The current in the output of channels A and B lags the current impressed by the terminals 14 and 14a on the winding 11. The current impressed by channel A on the primary winding 17a is reversed 180° in polarity to change it so that it leads the current in the winding 11. Thus from a single phase input current, a current that lags the input current and a current that leads the input current is attained.

Each channel has three magnetic amplifiers providing three stages of amplification. Each magnetic amplifier has two saturable reactors. Each reactor comprises a bias winding, a control winding and an anode winding wound around the center core. The bias windings are connected to the bias supply terminals 15, 15a and the anode windings are connected to the input transformer 18. The control windings of the first stage are connected to the control terminals 16, 16a and the control windings of the second and third stages are connected to the anode circuit of the preceding stage. A constant direct current passes through the bias windings from the terminals 15, 15a and creates a flux in each of the reactors that places the reactor on the proper operating range.

The control current through the control windings of the saturable reactors of the first stage is determined by the voltage impressed across the terminals 16 and 16a and the control windings are wound so that the current through the control windings of one channel creates a flux additive to the anode windings of that channel while the control windings of the first stage of the other channel create a flux in opposition to the flux of the anode windings of that stage. The first stage having control windings that create a flux in addition to the flux of the anode winding will have an increased output and will correspondingly increase the outputs of the second and third stages. The first stage having control fluxes that are in opposition to the anode fluxes will have a reduced output and the succeeding second and third stages will also have reduced output since the flux in these stages will be reduced. Thus the control voltage across terminals 16, 16a will increase the output of one channel and reduce the output of the other rotating the motor. Reversal of polarity of the control voltage will reverse the magnitude of the outputs and the direction of rotation of the motors.

Each stage of channel A is balanced with the corresponding stage of channel B so that the channels are equalized when no control voltage is impressed. Balancing potentiometers may be provided in the anode circuits to equalize corresponding stages. Potentiometer 62 balances the current through the anode windings of the first stage and the control windings of the second stage and potentiometer 98 balances the currents through anode windings of the second stage and the control windings of the third stage. The potentiometers 23, 24, 25 may be provided in the bias circuits to adjust the currents through the bias windings of the first, second and third stages respectively.

Considering the control apparatus in detail, the bias circuit comprises three resistors 20, 21 and 22 connected in series across the terminals 15 and 15a. The center resistor 21 has taps 21a, 21b, 21c, 21d, and 21e. Tap 21c is the center tap. The taps 21a and 21b are on the negative side of tap 21c and taps 21d and 21e are on the positive side. Potentiometers 23, 24 and 25 are provided with slidable contacts 23a, 24a and 25a respectively connected to the center tap 21c to adjust the currents through the bias windings of the first stage of channel A and channel B and adjust the current through the bias windings of the second stage of channel A and channel B and the bias windings of the third stage of channels A and B.

The saturable reactor 26 and the saturable reactor 27 of the first stage of channel A have bias windings 26b and 27b respectively. Reactor 28 and reactor 29 of the first stage of channel B have bias windings 28b and 29b respectively. Bias windings 26b and 27b are connected in series by the wire 30 with the bias winding 26b connected to potentiometer 25 by wire 31 and bias winding 27b connected to the negative tap 21b by wire 32 so that the current runs from the center contact 21c through the left portion of potentiometer 25 through the wire 31, winding 26b, wire 30, winding 27b and back to tap 21b through the wire 32. This current is preferably adjusted by the tap 21b so that the reactors 26 and 27 operate at the mid-point of the straight line portion of the operating characteristic. The bias winding 28b and bias winding 29b are connected in series by the wire 33 and bias winding 28b is connected by the wire 34 to the positive tap 21c and the bias winding 29b is connected by the wire 35 to the other side of the potentiometer 25 and through the contact 25c to the center tap 21c. The tap 21d is preferably adjusted as is the tap 21b to provide a current through the bias windings 28b and 29b so that the reactors operate at the midpoint of their operating range. The contact 25c is adjusted on the potentiometer 25 to adjust the currents through the windings 26b, 27b, 28b and 29b so that the reactors 26, 27, 28 and 29 are balanced.

As previously stated, the direct control voltage is applied to the terminals 16 and 16a and is connected across the control windings 26c and 27c in series and across control windings 28c and 29c in series. The windings 26c, 27c are connected in parallel with the windings 29c and 28c with the current flowing in the opposite directions so that with the impression of the voltage across one of the terminals 16 and 16a the flux of the control windings of one stage will buck the flux of the anode winding of that stage and the flux of the control windings of the other stage will be additive to the flux of the anode winding of that stage.

Control resistor 37 with control resistors 37a, 37b, 37c determine the current through the control windings of the first stage and the gain of the channels A and B. The contact 38 may be moved to place in the circuit either resistor 37a, 37b or 37c to obtain a coarse adjustment of the gain and resistor 37 provides a fine adjustment. Windings 26c and 27c are connected in series by the wire 41 and winding 26c is connected directly to the terminal 16a by the wires 42 and 43. Control winding 27c is connected by wire 44 to the resistor 39, from the resistor 39 to the control resistors 37a, 37b and 37c by the wire 45 and thus to the terminal 16. The control windings 28c and 29c are connected in series by the wire 47 and control winding 29c is connected to the terminal 16 by the wires 49, balancing resistor 40 to the wire 45 and resistor 37. It is thus seen that the control windings of the first stage of channel A are reversed in their connections across the terminals 16 and 16a.

Assuming that the terminal 16 is positive, current will flow through the resistor 37 to the wire 45 to the junction between resistors 39 and 40 and divides between the two stages. After the current splits it passes through the resistor 39 to the wire 44 and through the winding 27c creating a flux in opposition to the flux of the anode winding 27a. Current then passes up through the wire 41 and through the control winding 26c in opposition to the flux of winding 26a. The outputs of the reactors 26, 27 are reduced and the output of the first stage of channel A is reduced. The current then returns through the wires 42, 43 to the terminal 16a. When this direct voltage is impressed on the terminals 16, 16a, the output of channel A is reduced. The output current of the reactors in the first stage of channel B is increased and channel B then controls the direction of speed of rotation of the motor 10.

By applying a positive voltage to the terminal 16a and a negative voltage to terminal 16, the current flows in the opposite direction through the control windings and the windings 26c and 27c increase the flux in the reactors increasing the output current from the anode windings. In channel B on the other hand, the windings 28c and 29c buck the windings 28b and 29b to reduce the flux and decrease the output current. Channel A then controls the direction and speed of rotation of the motor 10.

The anode windings of the first stage of channel A are connected to the secondary winding 18b of the input transformer 18 and to the control windings 50c and 51c of the reactors 50 and 51 respectively. The anode winding 26a is connected by the wire 53 to the tap 18e of the secondary transformer 18b. The other end of the winding 26a is connected by wire 54 through rectifier 55 and wire 56 to the control winding 51c. The anode winding 27a is connected by wire 57 to the tap 18g of the secondary winding 18b. The other end of the winding 27a is connected by wire 58 through the rectifier 59 to the control winding 51c by the wire 56. The anode windings 26a and 27a are thus connected to the same control winding 51c at the same point. The control windings 50c and 51c are connected in series by the wire 61 and the other end of the control winding 50c is connected to a balancing resistor 62 with a contact 62a. Contact 62a is connected to the center tap 18f of the secondary winding 18b. The taps 18e and 18g are on opposite sides of this center tap and have voltages of opposite polarity impressed across them so that winding 26a is at one polarity when the winding 27a is at the opposite polarity. The voltage across the contact 62a and junction 63 will be of opposite polarity to the voltage across the contact 62a and junction 66. However, the rectifiers 55 and 59 only pass the current to the control windings 51c, 50c in the direction to add to the flux. The reactors of the first stage of channel A are alternately conductive and deliver to the control windings 50c and 51c a pulsating direct current.

The anode windings of the first stage of channel B are similarly connected to the control windings of the second stage of channel B. Therefore, the magnitude of the output of either channel is dependent upon the polarity of the control voltage impressed across the terminals 16 and 16a.

The anode winding 28a is connected to the junction 63 and by the wire 53 to the tap 18e. The other end of the winding is connected through the rectifier 67, wire 68 to the control winding 65c. The wire 69 connects the control coil windings 65c and 64c in series. The other end of the winding 64c is connected to the proportioning potentiometer 62 and thence through contact 62a and wire 100 to center tap 18f. The anode winding 29a is connected by the wire 71 to the rectifier 72 and by the wire 68 to the control winding 65c. As with channel A, the rectifiers 67 and 72 pass the current in the same direction and are connected to the control winding 65c at the same end. This circuit is identical with the other circuit of channel A. The current through the control windings creates a flux additive to the flux created by the anode windings and amplifies the current change in the anode windings. If the first stage is not reduced in output by the control voltage of terminals 16, 16a, the same current is applied to the control windings of the second stage and the currents in the anode winding of the second stage are not changed.

Assuming that the junction point 63 is positive, current will pass through both the anode winding 26a and anode winding 28a. With no control voltage on either amplifier the currents through the two windings will be equal and will pass through the rectifiers to the control windings of the second stage which will produce an equal effect on the second stage. With a control voltage impressed on the first stages of both channels the output of one stage will be reduced and the output of the other stage will increase depending on the value of the control current applied as the value of the current increases the output of the saturable reactors of the first stage will increase and the other decrease. The other stages and the output of the respective channels will be correspondingly increased or reduced.

The bias windings of the second stage of the saturable reactors may be connected in the same arrangement as the bias windings of the saturable reactors of the first stage. The bias windings 50b and 51b are connected in series by the wire 75. The other end of the winding 50b is connected by the wire 76 to the potentiometer 23 and the other end of the winding 51b is connected by the wire 77 to the terminal 15. The current flows from the positive tap 21c through the contact 23c through the wire 76 and the winding 50b. The current then flows through the wire 35 to the winding 51b and returns by the wire 75 to the negative terminal 15. The bias windings 64b and 65b of the second stage of the saturable reactors 64 and 65 are connected in series by the wire 78. The other end of the bias winding 64b is connected by the wire 80 to the positive terminal 15a. The other end of the bias winding 65b is connected to the other end of the resistor 23. The contact 23c may be adjusted to set the currents through the bias windings of the second stage of each channel. A constant direct current passes through the bias windings from the terminals 15, 15a and creates a flux in each of the saturable reactors to place them at their proper operating range. The potentiometers 62 and 98 are used to adjust the outputs of the respective stages so that the output of channels A and B are canceled on a zero control voltage. The potentiometers 23, 24, 25 in the bias circuit may be used to adjust the currents through the bias windings of the first, second and third stages respectively.

The anode winding 50a of the saturable reactor 50 is connected to the junction point 82 and by the wire 83 to the tap 18c on the secondary of the input transformer. The other end of the winding 50a is connected through a rectifier 84 by the wiers 85 and 86 to the control winding 91a of the saturable reactor 91. The anode winding 51a is connected to junction point 87 and by wire 88 to the tap 18j of the secondary transformer 18. The other end of the winding 51a is connected through rectifier 95 by the wires 96 and 86. As in the case of the first stage, the rectifiers 84 and 95 conduct current in a direction through the control windings 90c and 91c that is additive to the anode flux. The control windings 90c and 91c are connected in series by the wire 97. The winding 90c is connected to the balancing potentiometer 98 by the wire 99. Contact 98a is connected by the wire 100 to the center tap 18f of the secondary of the transformer 18 so that the voltage across the terminals 18c and 18f is impressed between junction point 82 and contact 98a and that the voltage across the terminals 18j and 18f is impressed across junction point 87 and contact 98a. It is thus seen that the saturable reactors 50 and 51 are alternately conducted.

If the junction point 82 is positive with respect to the contact 98a, the current will flow through the anode winding 50a, wire 85 and the rectifier 84 to the control winding 91c of the saturable reactor 91. This current is additive to the current in the anode winding 91a and increases the flux in the core of the reactor 91. Current then passes through the wire 97 to the control winding 90c and creates a flux additive to the flux created by the anode winding 90a. The current then returns to the transformer 18 through wire 99, resistor 98 and wire 100.

In channel B the anode windings 64a and 65a are similarly connected to the control windings 92 and 93. One end of the anode winding 64a is connected at the junction point 82. The other end is connected by the wire 101 to the rectifier 102 and wire 103 to the control winding 93c of the reactor 93. The anode winding 65a is connected at one end at the junction point 87 and at the other end to the control winding 93c by the wire 104, rectifier 105 and the wire 103. The anode windings 64a and 65a are thus connected to the same point on the control winding 93c. Wire 107 connects the two control windings 93c and 92c in series and the other end of the control winding 92c is connected to the potentiometer 98 and thus by the wire 100 to the tap 18f of the transformer 18. The currents through the anode windings 50a, 51a, 64a and 65a are equalized when no control voltage is applied by the positioning of the contact 98c on potentiometer 98 so that the second stages of the channels A and B are balanced.

The output or third stage of the channels A and B comprise the saturable reactors 90, 91 and saturable reactors 92, 93 respectively. The bias windings 90b and 91b are connected by the wire 109 in series and the other end of the winding 90b is connected by the wire 110 to the potentiometer 24 and the other end of the bias winding 91b is connected by the wire 111 to the tap 21a. The current flows through wire 110 through the bias winding 90b, then through wire 109 to the bias winding 91b and back through wire 111. The bias windings of the reactors 92, 93 are connected in series by the wire 114 and the upper bias winding 92b is connected by the wire 112 to the tap 21e and the other end of the bias winding 93b is connected by the wire 113 to the other side of the proportioning resistor 24. The contact 24c may be used to adjust the currents through the bias windings.

The anode windings of the saturable reactor 90 and 91 are connected in parallel. One end of the windings 90a and 91a are connected to junction point 115 and the other ends are connected through the rectifiers 116 and 117 respectively to the terminal 118 of the secondary winding 17a of the output transformers. The anode windings 92a, 93a are also connected in parallel with the ends of the respective windings connected to the junction point 115. The other ends of the windings are connected through the rectifiers 119 and 120 respectively to the terminal 121 of the primary winding 17a. The junction point 115 is connected by the wire 122 to the tap 18h of the secondary winding 18b of the input transformer. The center point 123 of the primary winding 17a is connected by the wire 124 to the tap 18b at the opposite end of the secondary winding 18b. Thus the voltage across the secondary winding is alternately impressed between the junction point 115 and center point 123. When the junction point 115 is positive, current flows through the wire 122, passing through the anode winding 90a, thence through rectifier 117 to the terminal 118 through the primary winding 17a to the center point 123 and back through the wire 124 to the secondary of the input transformer. When the junction point 115 is negative, the current flows through the anode winding 91a and in the reverse direction through the primary winding 17a between the terminal 118 and center point 123. In the case of channel B when junction point 115 is positive, the current passes through the winding 92a and when it is negative, passes through the winding 93a.

The output voltages of channel A or channel B are either in phase or 180° out of phase with the supply voltage. The capacitor 125 is connected across the primary winding 17a and causes the outputs of the third stage of each channel to be 90° out of phase with the supply voltage. Hence the voltage impressed across the winding 12 is 90° out of phase with the fixed phase voltage of the motor and a torque will be created to turn the motor.

In the foregoing description a particular embodiment of this invention has been described. It is not intended to limit this to a particular type of saturable reactor. Other types may be used. Although the bias windings have been described specifically it is understood that any bias winding that sets the reactor at the proper operating range may be used. Other changes and modifications may be made without departing from the scope of the invention.

I claim:

1. A motor control apparatus having a direct current signal source controlling the rotation of a two phase electric motor with a fixed field winding and a variable phase winding energized from a single phase source comprising a first control channel and a second control channel, each channel having a magnetic amplifier in the input stage, said magnetic amplifier having anode windings and control windings, means for connecting said control windings of a respective input stage across said direct signal source with the control windings of the first channel reversed in relation to the control windings of the second channel so that on application of a polar signal the impedance of one input stage increases and the impedance of the other input stage decreases, and each channel having a magnetic amplifier in the output stage, said magnetic amplifier having control windings and anode windings, means for coupling the anode windings in parallel across the single phase current supply to alternately pass the output current, said means including means for connecting the anode windings of the first channel output stage to one end of the variable field winding and for connecting the anode windings of the second channel output stage to the other end of the variable field winding to reverse the phase of the output current supplied to the field winding on reversal in polarity of the signal source.

2. A motor control apparatus having a direct current signal source controlling the rotation of a two phase electric motor with a fixed field winding and a variable phase winding energized from a single phase source comprising a first control channel and a second control channel, each channel having a magnetic amplifier in the input stage, said magnetic amplifier having anode windings and control windings, means for connecting said control windings of a respective input stage across said direct signal source with the control windings of the first channel reversed in relation to the control windings of the second channel so that on application of a polar signal the impedance of one input amplifier increases and the impedance of the other input amplifier decreases, and each channel having a magnetic amplifier in the output stage, said magnetic amplifier having control windings and anode windings, means for coupling each anode winding of the first channel between one end of the variable phase field winding and the single phase source to alternately supply current to said field winding, means for coupling each anode winding of the second channel between the other end of the variable phase field winding and the single phase source to alternately supply current to said field winding, said output stages responding to a respective input stage to vary the output current in direct relation with the variation in impedances.

References Cited in the file of this patent

UNITED STATES PATENTS

| | | |
|---|---|---|
| 2,414,936 | Edwards et al. | Jan. 28, 1947 |
| 2,464,639 | Fitzgerald | Mar. 15, 1949 |
| 2,477,728 | Fitzgerald | Aug. 2, 1949 |
| 2,477,729 | Fitzgerald | Aug. 2, 1949 |
| 2,546,271 | McKenney et al. | Mar. 27, 1951 |
| 2,559,513 | Palmer | July 3, 1951 |
| 2,584,856 | Fitzgerald | Feb. 5, 1952 |
| 2,636,150 | McKenney et al. | Apr. 21, 1953 |

FOREIGN PATENTS

| | | |
|---|---|---|
| 954,455 | France | June 13, 1949 |

OTHER REFERENCES

Geyger: "Magnetic Amplifiers of the Balance Detector Type, Their Basic Principles, Characteristics, and Application," AIEE, paper 50-93, December 1949, pages 8, 10, 11, 19 and 22.